United States Patent
Yanagidate

(10) Patent No.: US 9,055,225 B2
(45) Date of Patent: Jun. 9, 2015

(54) DISPLAY DEVICE AND DISPLAY SYSTEM FOR PERFORMING A PHASE ADJUSTMENT FOR A PACKET

(71) Applicant: Olympus Corporation, Tokyo (JP)

(72) Inventor: Masaharu Yanagidate, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 210 days.

(21) Appl. No.: 13/716,845

(22) Filed: Dec. 17, 2012

(65) Prior Publication Data

US 2013/0100331 A1  Apr. 25, 2013

Related U.S. Application Data

(63) Continuation of application No. PCT/JP2011/061421, filed on May 18, 2011.

(30) Foreign Application Priority Data

Jun. 21, 2010 (JP) .................................. 2010-140501

(51) Int. Cl.
*H04N 5/225* (2006.01)
*H04N 5/232* (2006.01)
(Continued)

(52) U.S. Cl.
CPC ......... *H04N 5/23293* (2013.01); *H04N 17/004* (2013.01); *H04N 21/4122* (2013.01); *H04N 21/4223* (2013.01); *H04N 21/4305* (2013.01); *H04N 21/43637* (2013.01); *H04N 21/44227* (2013.01); *H04N 5/23206* (2013.01)

(58) Field of Classification Search
CPC ............................ H04N 5/23293; H04L 65/80

USPC .......................................... 348/211.99–211.14
See application file for complete search history.

(56) References Cited

U.S. PATENT DOCUMENTS

2003/0016289 A1\* 1/2003 Motomura ................. 348/211.5
2003/0120802 A1\* 6/2003 Kohno ......................... 709/237
(Continued)

FOREIGN PATENT DOCUMENTS

JP   09-261241 A   10/1997
JP   2004-104701 A   4/2004
(Continued)

OTHER PUBLICATIONS

Extended European Search Report dated Jul. 8, 2014, issued in European Patent Application No. 11797939.3 (7 pages).
(Continued)

*Primary Examiner* — Twyler Haskins
*Assistant Examiner* — Dwight C Tejano
(74) *Attorney, Agent, or Firm* — Westerman, Hattori, Daniels & Adrian, LLP

(57) ABSTRACT

Provided is a display device that processes images in a set cycle, creates image data for each frame or field and that has: a receiver that receives transmitted data from an imaging device that encodes image data as packets, creates transmission data and transmits said transmission data; a display processing unit that generates a display signal for display from the transmitted data; a measuring unit that measures the reception timing of specific packets among the transmitted data; a determination unit that determines the reception state of the specific packets and, based on the results of this determination, determines whether or not to use the received timing; and a processing unit that uses the reception timing and phase regulates the display signal if the determination unit determines to use the reception timing.

8 Claims, 14 Drawing Sheets

(51) Int. Cl.
*H04N 17/00* (2006.01)
*H04N 21/41* (2011.01)
*H04N 21/4223* (2011.01)
*H04N 21/43* (2011.01)
*H04N 21/4363* (2011.01)
*H04N 21/442* (2011.01)

(56) References Cited

U.S. PATENT DOCUMENTS

2006/0140252 A1   6/2006   Miller
2012/0218430 A1*  8/2012   Yanagidate ............... 348/211.2

FOREIGN PATENT DOCUMENTS

JP   2005-538596 A   12/2005
JP   2008-085500 A   4/2008
JP   2010-130395 A   6/2010

OTHER PUBLICATIONS

Japanese Notice of Allowance dated Jan. 14, 2014, in corresponding Japanese Application No. 2010-140501 with English Translation. (6 pages).
International Search Report for PCT/JP2011/061421, mailing date of Aug. 16, 2011.

* cited by examiner

DISPLAY DEVICE AND DISPLAY SYSTEM FOR PERFORMING A PHASE ADJUSTMENT FOR A PACKET

CROSS REFERENCE TO RELATED APPLICATIONS

This application is a continuation application based on a PCT Patent Application No. PCT/JP2011/061421, filed May 18, 2011, whose priority is claimed on Japanese Patent Application No. 2010-140501, filed on Jun. 21, 2010, the entire content of which are hereby incorporated by reference.

BACKGROUND OF THE INVENTION

1. Field of the Invention

The present invention relates to a display device that receives transmission data continuously transmitted from an image capturing device with a predetermined cycle and performs a display process. Furthermore, the present invention relates to a display system provided with an image capturing device and a display device.

2. Description of the Related Art

When image data is wirelessly transmitted as data packets, since clocks of a transmission side and a reception side are different from each other, overflow or underflow occurs in the reception side. As a countermeasure thereof, in Japanese Unexamined Patent Application, First Publication, No. 2004-104701, the transmission side creates originating time information using a transmission clock, packetizes the originating time information with the image data, and transmits packetized packets to a network, and the reception side decomposes reception packets to extract the originating time information and coded data, stores the extracted originating time information and coded data in a fluctuation absorption buffer, reads the stored coded data based on the originating time information and a reference time to decode the coded data according to the reference time, further calculates relative delay fluctuation times at which the reception packets have been received based on the originating time information and the reference time, and adjusts the reference time according to values obtained by smoothing the relative delay fluctuation times for the reception packets.

However, in the conventional art described above, since time information for fluctuation time measurement is inserted into the packets and a fluctuation time is calculated based on the inserted time information, when the transmission of the packets is irregularly performed, or when the packet transmission is performed through a large scale network, it is effective when arrival times of individual packets are significantly changed, but the time information is added and thus the amount of transmission data corresponding to the time information is increased.

SUMMARY

The present invention provides a display device and a display system by which it is possible to perform a display process in synchronization with an operation of an image capturing device while suppressing an increase in the amount of transmission data.

A display device in accordance with the preferred embodiment of the present invention may include: a reception unit that receives transmission data from an image capturing device that performs an image capturing process with a predetermined cycle to create image capturing data in each frame or field, packetizes the image capturing data to create the transmission data, and performs a transmission process of the transmission data; a display processing unit that performs a display process of creating a display signal for display from the transmission data; a measurement unit that measures a reception timing of a specified packet of the transmission data; a determination unit that determines a reception state of the specified packet, and determines whether to use the reception timing based on a result of the determination; and a processing unit that performs a phase adjustment process of the display signal using the reception timing when the determination unit determines the reception timing to be used.

Preferably, the determination unit may determine, as the reception state of the specified packet, whether the specified packet has been retransmitted.

Preferably, the determination unit may detect a change in a specified pattern added to the specified packet, and determine whether the specified packet has been retransmitted.

Preferably, the determination unit may detect a change in a reception interval of the specified packet, and determine whether the specified packet has been retransmitted.

Preferably, a fact that the specified packet is not subjected to a retransmission process may be designated in advance, and the determination unit may determine, as the reception state of the specified packet, whether the specified packet has been received.

Preferably, at least one of a plurality of packets corresponding to one frame or one field of transmission data immediately after an operation of the image capturing device or the display device starts may be designated as the specified packet, and designation of the specified packet of transmission data may be continued until the specified packet is received without performing the retransmission process.

Preferably, the specified packet may be at least one of the plurality of packets corresponding to one frame or one field of the transmission data, and may be a packet that is periodically designated and transmitted by the image capturing device.

Preferably, the specified packet may be at least one of the plurality of packets corresponding to one frame or one field of the transmission data, and may be designated based on a request of the display device.

Preferably, the specified packet may be transmitted using a scheme resistant to deterioration of a transmission path compared with other packets.

A display system in accordance with the preferred embodiment of the present invention including an image capturing device and a display device, wherein the image capturing device may include: an image capturing unit that performs an image capturing process with a predetermined cycle to create image capturing data in each frame or field; a data processing unit that packetizes the image capturing data to create transmission data; and a transmission unit that transmits the transmission data. The display device may include: a reception unit that receives the transmission data from the image capturing device; a display processing unit that performs a display process of creating a display signal for display from the transmission data; a measurement unit that extracts a specified packet from the transmission data and measures a reception timing of the specified packet; a determination unit that determines a reception state of the specified packet, and determines whether to use the reception timing measured by the measurement unit based on a result of the determination; and a processing unit that performs a phase adjustment process of the display signal using the reception timing when the determination unit determines the reception timing to be used.

According to the present invention, the specified packet is extracted from the transmission data and the phase adjustment process of the display signal is performed using a result obtained by measuring the reception timing of the specified packet, so that it is possible to perform a display process in synchronization with an operation of the image capturing device while suppressing an increase in the amount of the transmission data.

DESCRIPTION OF THE PREFERRED EMBODIMENTS

Hereinafter, preferred embodiments of the present invention will be described with reference to the accompanying drawings.

First Preferred Embodiment

First, with reference to FIG. 1 to FIG. 9, a first preferred embodiment of the present invention will be described. In the first preferred embodiment, a description will be made of an example in which the present invention is applied to a display system including an image capturing device, which creates image data by performing image capturing with a predetermined cycle and creates transmission data including a plurality of packets from the image data, and a display device (a reception device) which receives the transmission data and creates a display signal.

Figure 1:
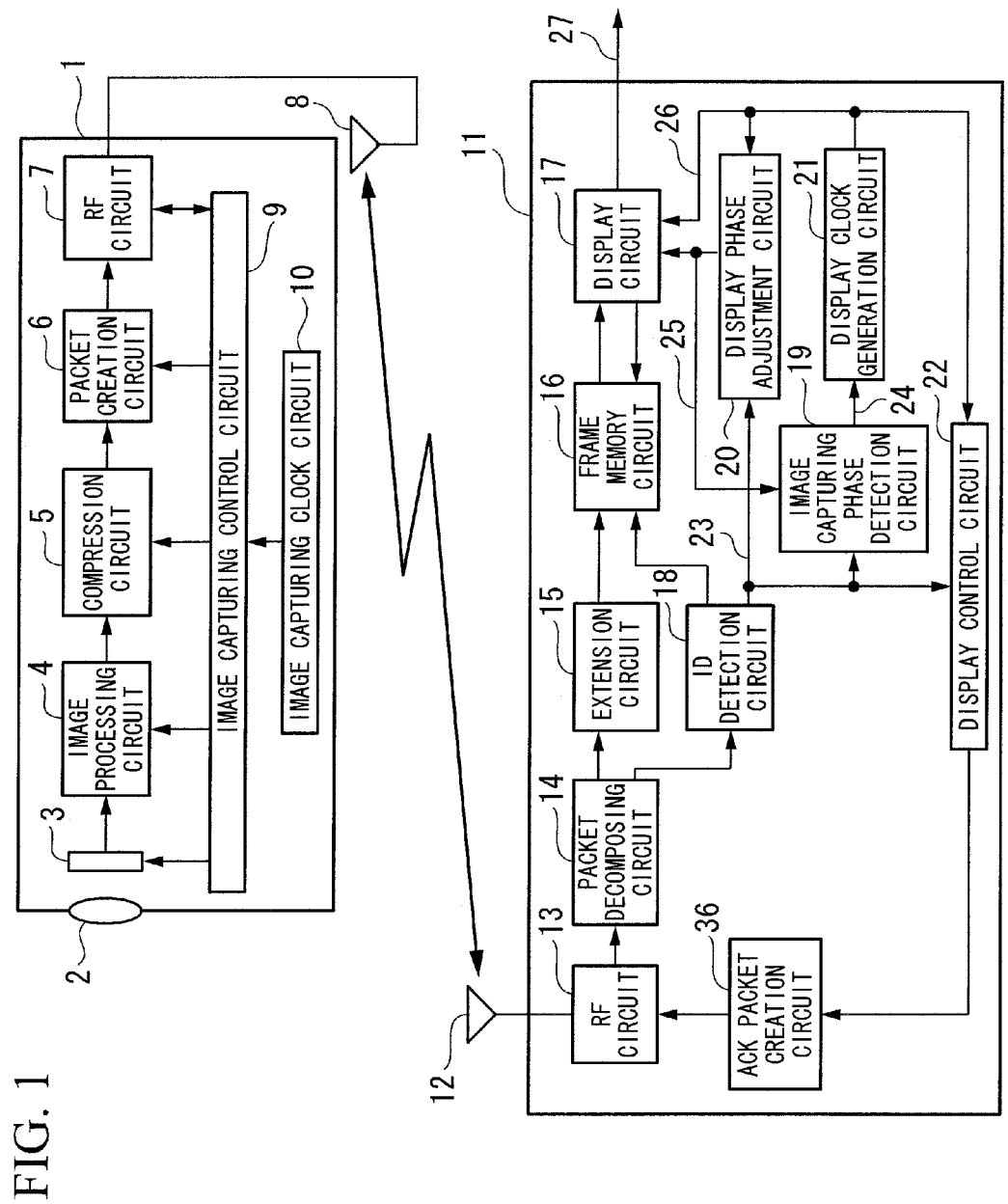
FIG. 1 is a block diagram illustrating the configuration of a display system in accordance with a first preferred embodiment of the present invention.

FIG. 1 illustrates the configuration of the display system in accordance with the first preferred embodiment of the present invention. The display system illustrated in FIG. 1 includes an image capturing device 1 and a display device 11. The image capturing device 1 includes an image capturing optical system 2, an image sensor 3 (an image capturing element), an image processing circuit 4, a compression circuit 5, a packet creation circuit 6, an RF circuit 7, an antenna 8, an image capturing control circuit 9, and an image capturing clock circuit 10.

The image capturing optical system 2 allows an optical image of an object to be formed on the image sensor 3. The image sensor 3 converts the formed optical image into image capturing data and outputs the image capturing data to the image processing circuit 4. In the first preferred embodiment, the image sensor 3 performs progressive scanning and outputs image capturing data in units of frames with a predetermined cycle. In the following description, a phase of the image capturing data output from the image sensor 3 will be referred to as an image capturing phase.

The image capturing data is subjected to image processing by the image processing circuit 4, is converted into coded data by the compression circuit 5, and is output to the packet creation circuit 6. The packet creation circuit 6 collects the coded data for each predetermined data amount and creates image information. Moreover, the packet creation circuit 6 adds well-known addition information including ID information, which is identification codes for identifying packets, to the image information and generates data packets (transmission data).

Figure 2:
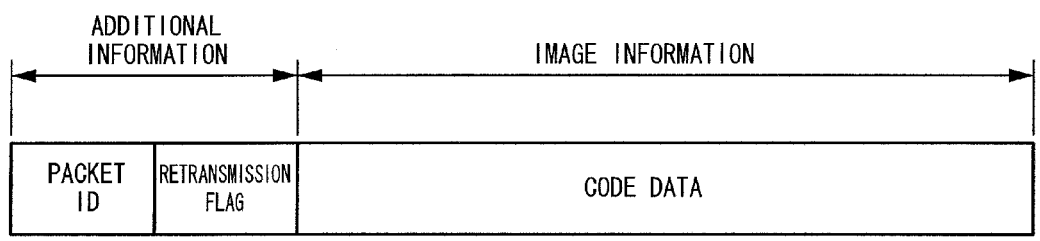
FIG. 2 is a configuration diagram illustrating the configuration of data packet in accordance with the first preferred embodiment of the present invention.

FIG. 2 illustrates the configuration of the data packet. As illustrated in FIG. 2, the data packet of the first preferred embodiment includes additional information, which includes a packet ID indicating a type of packet and a number (indicating a position in a frame of image information of the packet) and a retransmission flag indicating whether the data packet is a retransmitted data packet, and image information including coded data.

When a communication environment is deteriorated and it is difficult for the display device 11 to receive the data packet, a retransmission process is performed. The retransmission process methods have been variously proposed. For example, in a method using an ACK packet, when a data packet is received, the display device 11 transmits an ACK packet, which indicates the reception of the data packet, to the image capturing device 1. The image capturing device 1 waits to receive the ACK packet after the data packet is transmitted, and performs a retransmission process when it is difficult to receive the ACK packet within a predetermined time.

In the retransmission process, the image capturing control circuit 9 controls the RF circuit 7 and waits to receive the ACK packet. When it is difficult to receive the ACK packet within a predetermined time, the image capturing control circuit 9 performs the retransmission process of the data packet. In the case of retransmitting the data packet, the image capturing control circuit 9 instructs the packet creation circuit 6 to turn ON the retransmission flag. The packet creation circuit 6 sets the retransmission flag to ON in response to the instruction of the image capturing control circuit 9.

Through the aforementioned process, image data corresponding to one screen is divided into a predetermined number of packets and is transmitted. In the first preferred embodiment, a description will be made for a case in which a head packet of a frame is a specified packet to be used in phase adjustment in the display device 11. In the first preferred embodiment, a description will be made for a case in which the image data corresponding to one screen is divided into four packets.

The operations of the image sensor 3, the image processing circuit 4, the compression circuit 5, the packet creation circuit 6, and the RF circuit 7 are controlled by the image capturing control circuit 9, and the operation of the image capturing control circuit 9 is performed based on an image capturing clock from the image capturing clock circuit 10. To this end, the operation of the image capturing device 1 is performed in synchronization with the image capturing clock. Since the aforementioned technique until the image sensor 3 generates and packetizes the image capturing data has been well known in the art, a detailed description thereof will be omitted here.

The packets created by the packet creation circuit 6 are wirelessly transmitted by the RF circuit 7 through the antenna 8. In the first preferred embodiment, the transmission of a head packet of each frame is started at a predetermined phase with respect to the image capturing phase.

The display device 11 is a device that receives transmission data and creates a display signal 27, and adjusts a phase of the display signal 27 based on a reception timing of a specified packet of a frame head not subjected to the retransmission process. Hereinafter, a detailed description thereof will be omitted here.

The display device 11 includes an antenna 12, an RF circuit 13, a packet decomposing circuit 14, an extension circuit 15, a frame memory circuit 16, a display circuit 17, an ID detection circuit 18, an image capturing phase detection circuit 19, a display phase adjustment circuit 20, a display clock generation circuit 21, a display control circuit 22, and an ACK packet creation circuit 36.

The RF circuit 13 receives a wireless signal through the antenna 12, demodulates the received wireless signal, and outputs transmission data to the packet decomposing circuit 14. The packet decomposing circuit 14 decomposes packets constituting the transmission data into image information and additional information, and outputs the image information and the additional information to the extension circuit 15 and the ID detection circuit 18, respectively.

The extension circuit 15 extends the coded data, converts the coded data into display data, and outputs the display data to the frame memory circuit 16. The display data is stored in the frame memory circuit 16. The display data stored in the frame memory circuit 16 is appropriately read by the display circuit 17. The display circuit 17 converts the display data into the display signal 27 for display (a display process), and outputs the display signal 27. The phase of the display signal 27 is determined by a value of display phase data 25 added to the display circuit 17. The value of the display phase data 25 is adjusted by the display phase adjustment circuit 20. Furthermore, the frequency of the display signal 27 is controlled by a display clock 26 added to the display circuit 17. The display clock 26 is supplied from the display clock generation circuit 21.

The ID detection circuit 18 detects the packet ID from the additional information of the packet of the frame head, and outputs the packet ID to the frame memory circuit 16. A number in the packet ID indicates the position in the frame of the image information of the packet. The frame memory circuit 16 creates address information to be used when storing the display data from the extension circuit 15.

Moreover, the ID detection circuit 18 creates an ID detection timing signal 23 indicating a detection timing of the packet ID, and outputs the ID detection timing signal 23 to the image capturing phase detection circuit 19 and the display phase adjustment circuit 20. The ID detection timing signal 23 indicates a reception timing when the packet of the frame head has been received without retransmission.

The ID detection circuit 18 recognizes the packet of the frame head by the packet ID, further determines a reception state of the packet, and determines whether to create the ID detection timing signal 23 according to results of the determination. In detail, the reception state of the packet in the first preferred embodiment is whether the packet is retransmitted. The ID detection circuit 18 detects that a transmission flag of the packet of the frame head is turned OFF, thereby creating the ID detection timing signal 23 when checking that it is not a retransmitted packet.

As described above, the ID detection timing signal 23 indicates the reception timing of the packet of the frame head, wherein the reception timing of the packet of the frame head is determined by the image capturing phase of the image capturing device 1. Therefore, the ID detection timing signal 23 is synchronized with the image capturing phase of the image capturing device 1.

The image capturing phase detection circuit 19 holds the value of the display phase data 25 at the output time point of the ID detection timing signal 23, thereby creating image capturing phase data 24. The image capturing phase data 24 is output to the display clock generation circuit 21.

The ACK packet creation circuit 36 creates the ACK packet indicating that the data packet has been received normally. When the data packet has been received normally, the ACK packet creation circuit 36 creates the ACK packet according to the instruction of the display control circuit 22, and transmits the ACK packet to the RF circuit 13. The ACK packet is modulated by the RF circuit 13, and is transmitted to the image capturing device 1 through the antenna 12.

Figure 3:
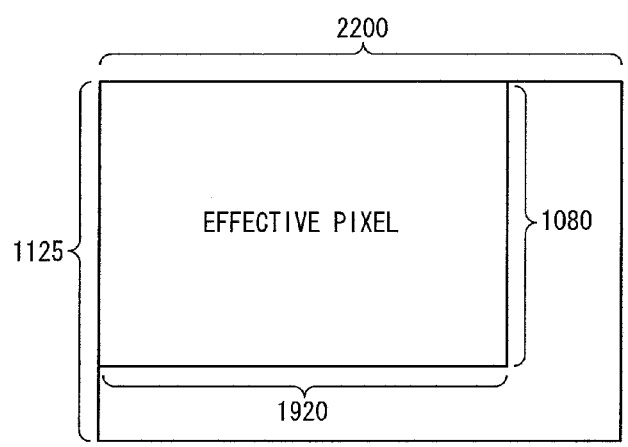
FIG. 3 is a configuration diagram illustrating the configuration of a display frame in accordance with the first preferred embodiment of the present invention.

FIG. 3 illustrates the configuration of a display frame in accordance with the first preferred embodiment of the present invention. In the display frame of the first preferred embodiment, the number of horizontal pixels is 2200, the number of vertical pixels is 1125, the number of effective horizontal pixels of effective pixels actually displayed is 1920, and the number of effective vertical pixels of the effective pixels actually displayed is 1080. A frame frequency is 30 Hz. Since the display frame conforms to HDTV video standards, a detailed description of the configuration of the display frame will be omitted here.

Figure 4:
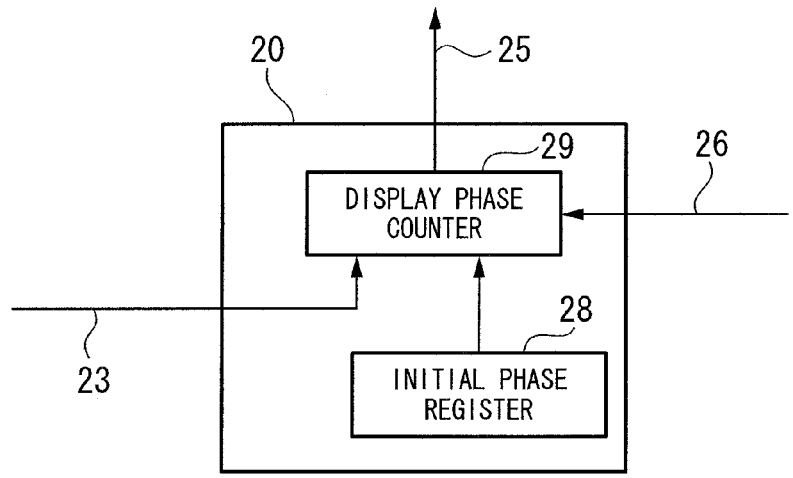
FIG. 4 is a block diagram illustrating the configuration of a display phase adjustment circuit in accordance with the first preferred embodiment of the present invention.

FIG. 4 illustrates the configuration of the display phase adjustment circuit 20. The display phase adjustment circuit 20 creates the display phase data 25 that controls the phase of the display signal 27. The display phase adjustment circuit 20 receives the ID detection timing signal 23 and the display clock 26, and outputs the display phase data 25. As illustrated in FIG. 4, the display phase adjustment circuit 20 includes a display phase counter 29 and an initial phase register 28.

The display phase counter 29 includes a horizontal counter and a vertical counter for generating the display phase data 25 corresponding to the display frame configuration illustrated in FIG. 3. The horizontal counter performs count up by the display clock 26, is reset to 0 on the $2200^{th}$ count, and repeats an operation of performing the count up again after the reset. In this way, the horizontal counter repeats counting of 0 to 2199. The vertical counter is configured to perform count up whenever the horizontal counter counts 2200, is reset to 0 on the $1125^{th}$ count, and repeats an operation of performing the count up again after the reset. In this way, the vertical counter repeats counting of 0 to 1124.

By these counters, counting of 2200×1125 is performed. Since the frequency of the display clock 26 is 74.25 MHz, a frame frequency is 30 Hz (=74.25 MHz/(2200×1125)).

Values of the horizontal counter and the vertical counter of the display phase counter 29 are output as the display phase data 25. The display phase data 25 is output to the display circuit 17 and the image capturing phase detection circuit 19. The display phase data 25 added to the display circuit 17 is used for adjusting the phase of the display signal 27.

In the first preferred embodiment, as illustrated in FIG. 3, the time point at which the values of the horizontal counter and the vertical counter are 0 is used as a head of effective pixels of the display frame. That is, image display is started from the time point at which the values of the horizontal counter and the vertical counter are 0.

In relation to the display phase counter 29 at the time of initial adjustment, the value of the initial phase register 28 is reset at the output time point of the ID detection timing signal 23. As a consequence, the phase of the display phase data 25 is initially adjusted to a predetermined phase based on the output timing of the ID detection timing signal 23.

Then, the display clock generation circuit 21 controls the frequency of the display clock 26, so that the phase of the display phase data 25 is adjusted to be held at a predetermined phase in synchronization with the image capturing phase (normal adjustment). Details of the adjustment will be described later with reference to FIG. 6 to FIG. 9.

Figure 5:
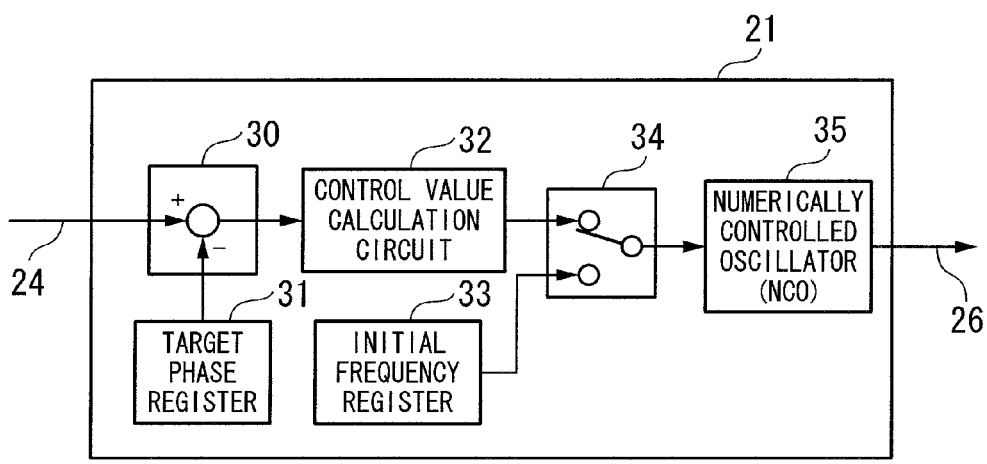
FIG. 5 is a block diagram illustrating the configuration of a display clock generation circuit in accordance with the first preferred embodiment of the present invention.

FIG. 5 illustrates the configuration of the display clock generation circuit 21. The display clock generation circuit 21 receives the image capturing phase data 24 and outputs the display clock 26. The display clock generation circuit 21 controls the frequency of the display clock 26 such that the image capturing phase data 24 has a predetermined value. The display clock generation circuit 21 includes a subtraction circuit 30, a target phase register 31, a control value calculation circuit 32, an initial frequency register 33, a selector 34, and a numerically controlled oscillator 35.

The subtraction circuit 30 performs subtraction of the image capturing phase data 24 input to the display clock generation circuit 21 and a target phase value stored in the target phase register 31. A result of the subtraction is output to the control value calculation circuit 32. In a normal adjustment period in which the initial adjustment has been completed, the control value calculation circuit 32 adjusts a frequency control value supplied to the numerically controlled oscillator 35 to control the frequency of the display clock 26, thereby adjusting the display phase data 25 output from the display phase adjustment circuit 20, further controlling the image capturing phase data 24 output from the image capturing phase detection circuit 19, and controlling the subtraction result of the subtraction circuit 30 to be 0.

By a control loop including the image capturing phase detection circuit 19, the display clock generation circuit 21, and the display phase adjustment circuit 20, the phase of the display signal 27 is held at a predetermined phase in synchronization with the image capturing phase. Since details of the control loop are well-known in the art as a PLL (Phase Locked Loop), a description thereof will be omitted here.

The selector 34 receives a value output from the control value calculation circuit 32 and a value of the initial frequency register 33 for setting the frequency of the display clock 26 at the initial adjustment time point. The selector 34 selects output of the initial frequency register 33 in the initial adjustment period, and selects output of the control value calculation circuit 32 in the normal adjustment period rather than the initial adjustment period. The numerically controlled oscillator 35 has an output frequency which is changed according to an input frequency control value, and will not be described because it is well-known in the art as an NCO circuit.

The display control circuit 22 controls the operation of the display device 11, and supplies a control signal (not illustrated) to each element to control the operation of each circuit in the display device 11.

Next, with reference to FIG. 6 to FIG. 9, an adjustment method of the display phase in the initial adjustment period and the normal adjustment period will be described. The initial adjustment period in the first preferred embodiment is a period until the image capturing device 1 receives the transmission data and starts display immediately after the display device 11 starts to operate, and the normal adjustment period is a period until the operation is completed after the display of the transmission data is started.

Figure 6:
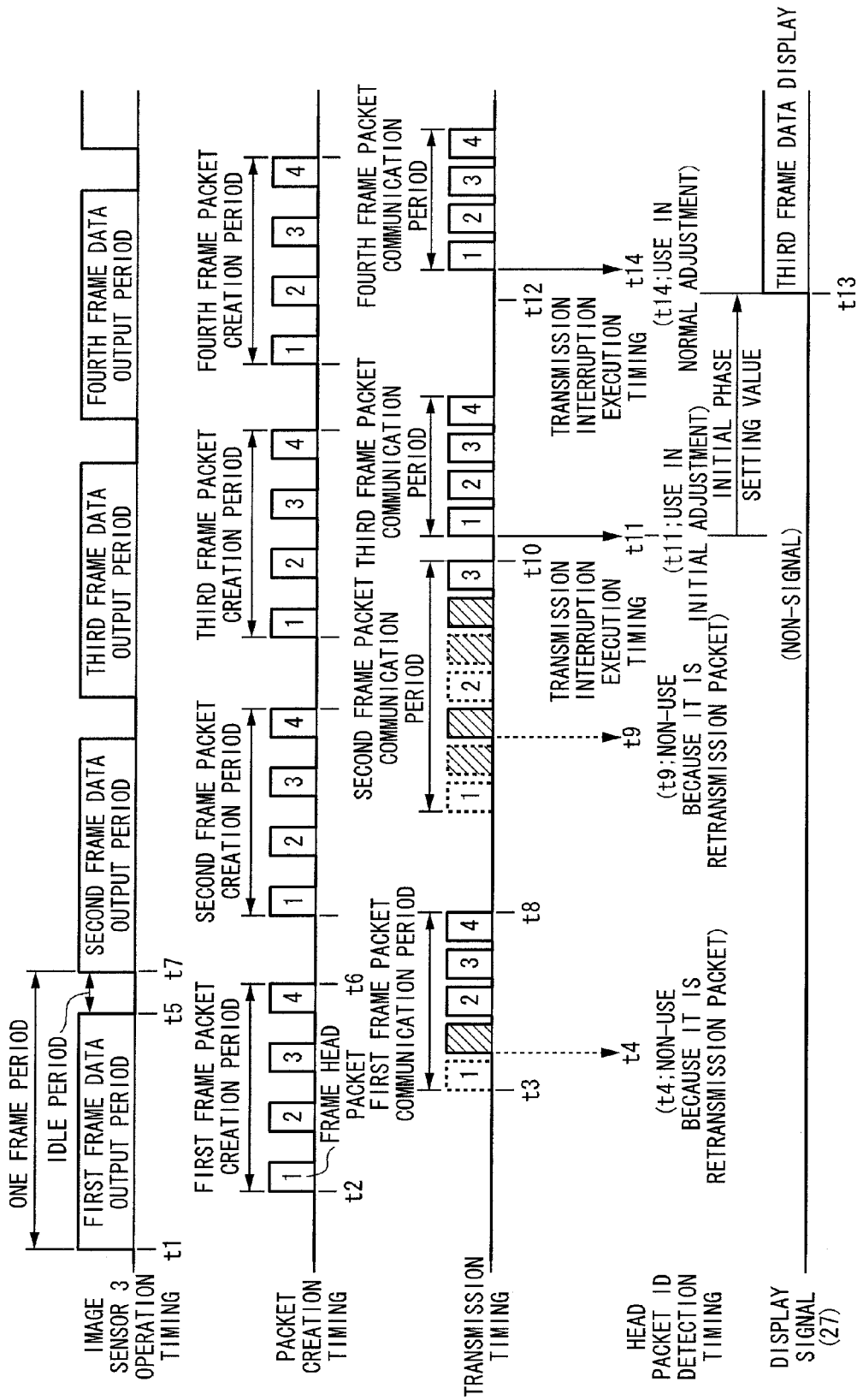
FIG. 6 is a timing chart illustrating a relation among the image capturing phase, the transmission timing, and the phase of the display signal in the initial adjustment period in accordance with the first preferred embodiment of the present invention.

FIG. 6 illustrates a relation among the image capturing phase, the transmission timing, and the phase of the display signal in the initial adjustment period. As illustrated in FIG. 6, the image sensor 3 repeats an operation of outputting image capturing data of a first frame in a period of times t1 to t5, and outputting image capturing data of a second frame after an idle period. In this case, a period of times t1 to t7 is one frame period, the time t1 indicates a start point of the image capturing phase of the first frame, and the time t7 indicates an end point of the image capturing phase of the first frame.

In the first preferred embodiment, the image sensor 3 operates at a frame rate of 30 frames per second, the period of the times t1 to t7 is ⅓₀ second (about 33.3 ms). The packet creation in the packet creation circuit 6 is started from the time point (the time t2) at which image capturing data has been subjected to a compression process and data corresponding to one packet has been prepared. In the first preferred embodiment, a method for generating four packets from the data corresponding to one packet will be described as an example.

A packet of the first frame is generated in the period of the times t2 to t6. When the packet creation is completed, the generated packet is appropriately transmitted. The time t3 indicates the timing at which the transmission of a head packet of the first frame has been started. The present invention employs an example in which a communication path is deteriorated at the time of transmission of the first frame and the second frame, the head packet is retransmitted in communication of the first frame, and communication corresponding to four packets is not completed and is interrupted (a time t10) in a predetermined period in the second frame.

In FIG. 6, times t4, t9, t11, and t14 indicate timings at which packet IDs of head packets of frames are detected. When a packet is retransmitted, a retransmission flag of a data packet is turned ON. Therefore, even when a retransmission packet is received, the ID detection timing signal 23 is not output from the ID detection circuit 18.

The retransmission process in the first preferred embodiment is performed using the ACK packet. Since the retransmission scheme is well known in the art, a description thereof will be omitted here.

The time t4 of FIG. 6 indicates the timing at which a packet ID of the retransmitted head packet is detected. However, since the received packet is the retransmission packet, the ID detection timing signal 23 is not output. Similarly, even at the time of reception of the head packet of the second frame, the ID detection timing signal 23 is not output. When the ID detection timing signal 23 is not output, the initial adjustment of the image capturing phase detection circuit 19, the display phase adjustment circuit 20, and the display clock generation circuit 21 is not performed, and the display circuit 17 holds the display signal 27 in a non-signal state.

The detection timing of the ID of a head packet of a third frame is the time t11. Since the head packet of the third frame has been detected without retransmission, the display phase adjustment circuit 20 is adjusted such that the ID detection timing signal 23 is output at the timing of the time t11, and the display of the third frame is started at the time t13 after a predetermined time lapses from the time t11, so that the display phase data 25 is determined.

As illustrated in FIG. 4, the ID detection timing signal 23 is input to the display phase counter 29, and the value of the initial phase register 28 is set in the display phase counter 29 at the timing of the time tn. Since the period of the times t11 to t12 is known, the value of the initial phase register 28 is set such that the value of the display phase counter 29 is 0 at the time point of the time t13. The time t13 is set immediately after the time t12 which indicates a communication interruption time point in the packet communication of the third frame.

The communication interruption is a process of stopping packet communication of a frame during communication in order to prevent unlimited extension of a communication time due to a frequent retransmission process of a packet when a communication path is deteriorated. That is, the completion of the packet communication of the frame is likely to be extended immediately before the communication interruption.

When the frame communication has been completed immediately before the communication interruption, the timing (the time t13) of display start has been set to the shortest time point at which it is possible to display a received frame packet. That is, among timings at which it is possible to display a frame packet subjected to communication completion immediately before the communication interruption, the timing at which a delay time of a display image is shortest is selected as the timing (the time t13) of the display start of the first preferred embodiment.

By the aforementioned process, image display by the display signal 27 is started from the time point of the time t13. The initial adjustment period is completed at the time point of the time t13.

Figure 7:
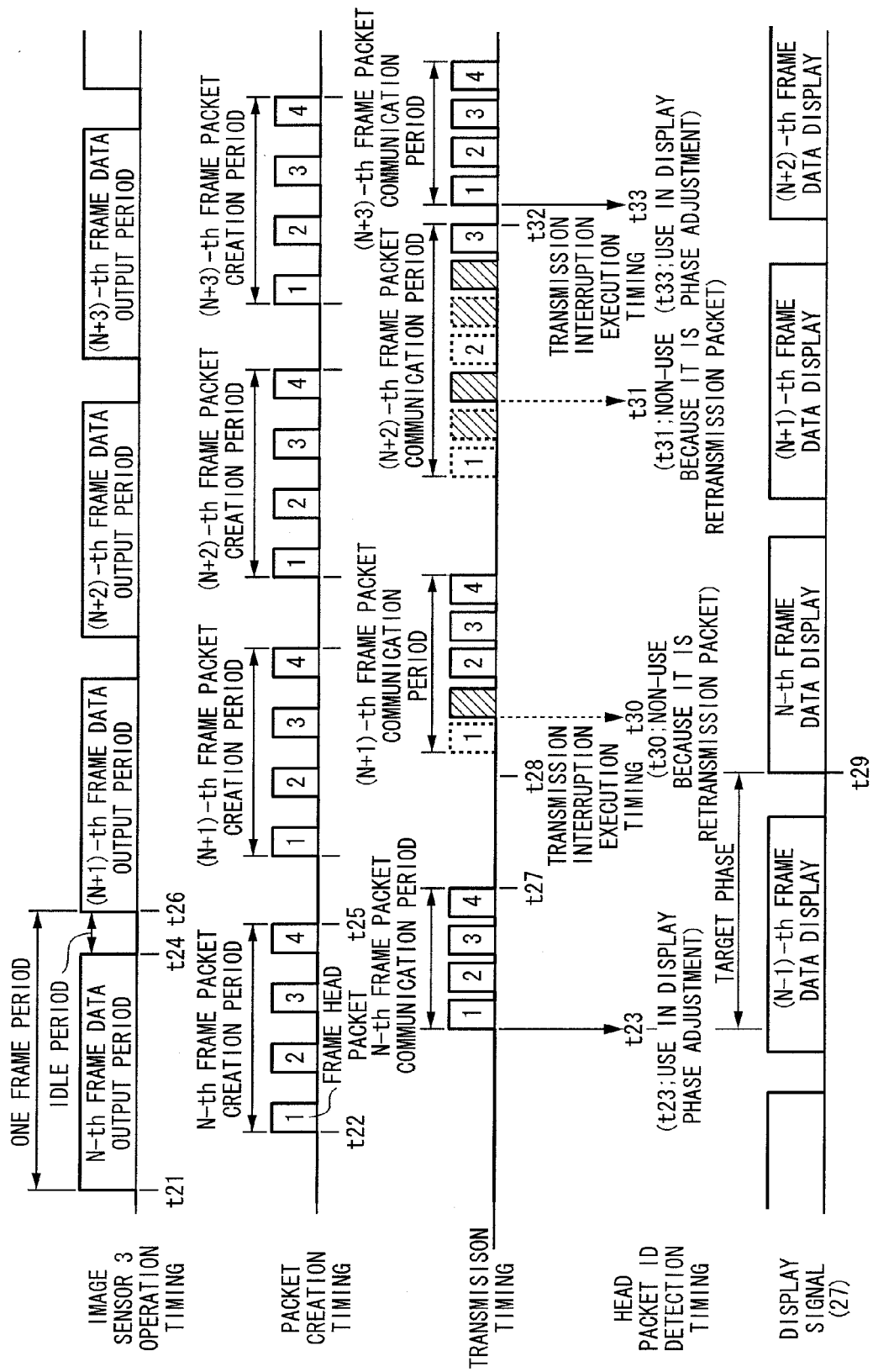
FIG. 7 is a timing chart illustrating a relation among the image capturing phase, the timing of the transmission data, and the phase of the display signal in the normal adjustment period in accordance with the first preferred embodiment of the present invention.

FIG. 7 illustrates a relation among the image capturing phase, the timing of the transmission data, and the phase of the display signal in the normal adjustment period. FIG. 7 illustrates a case in which a head packet is transmitted in an $N^{th}$ frame without retransmission, is retransmitted once in an $N+1^{th}$ frame, and is not transmitted in an $N+2^{th}$ frame at a predetermined time point (the time t31) due to frequency retransmission.

As illustrated in FIG. 7, the image sensor 3 repeats an operation of outputting image capturing data of the $N^{th}$ frame in a period of times t21 to t24, and outputting image capturing data of the $N+1^{th}$ frame after an idle period. In this case, a period of times t21 to t26 is one frame period, the time t21 indicates a start point of the image capturing phase, and the time t26 indicates an end point of the image capturing phase.

The packet creation in the packet creation circuit 6 is started from the time point (the time t22) at which image capturing data has been subjected to a compression process and data corresponding to one packet has been prepared. In FIG. 7, times t23, t30, t31, and t33 indicate timings at which packet IDs of head packets of frames are detected.

Initially, an operation regarding the $N^{th}$ frame will be described. The time t23 indicates the timing at which the display device 11 has detected a packet ID of a head packet of the $N^{th}$ frame. A time t28 indicates the timing at which communication interruption is performed in communication of the packet of the $N^{th}$ frame. A time t29 indicates the phase of the display signal 27 at which the display of data of the $N^{th}$ frame is started. As illustrated in FIG. 7, the time t29 is set immediately after the time t28.

Similarly to the initial adjustment period, the display phase of the display signal 27 in the normal adjustment period is adjusted such that a delay time of a display image is shortest among phases at which it is possible to display a frame packet subjected to communication completion immediately before the communication interruption. The display phase in the normal adjustment period is decided by a setting value of the target phase register 31 illustrated in FIG. 5.

In relation to the setting value of the target phase register 31, when the value of the display phase data 25 is 0 at the time point of the time t29, a value to be taken by the display phase data 25 at the timing of the time t23 is stored. When the packet ID of a packet of a frame head received without retransmission is detected, the setting value of the target phase register 31 is subjected to subtraction with the value of the image capturing phase data 24, and the frequency of the display clock 26 is controlled such that a result of the subtraction is 0. In this way, the phase of the display signal 27 is adjusted such that the value of the display phase data 25 is 0 at the time t29.

Next, an operation regarding the $N+1^{th}$ frame and the $N+2^{th}$ frame will be described. In communication of the $N+1^{th}$ frame and the $N+2^{th}$ frame, since all head packets are retransmitted, the detection timings (times t30 and t31) of the packet IDs of the head packets of frames are not used for adjusting the display phase. The display clock generation circuit 21 holds the frequency of the display clock 26 of non-adjustable periods (periods of the times t30 to t33) to the value at the time of last adjustment (the time t23).

Last, an operation regarding the $N+3^{th}$ frame will be described. In communication of the $N+3^{th}$ frame, since a head packet is communicated without retransmission, the detection timing (t33) of the packet ID of the head packet is used for adjusting the display phase. Since an operation in this case is the same as the operation in the $N^{th}$ frame, a description thereof will be omitted here.

Figure 8:
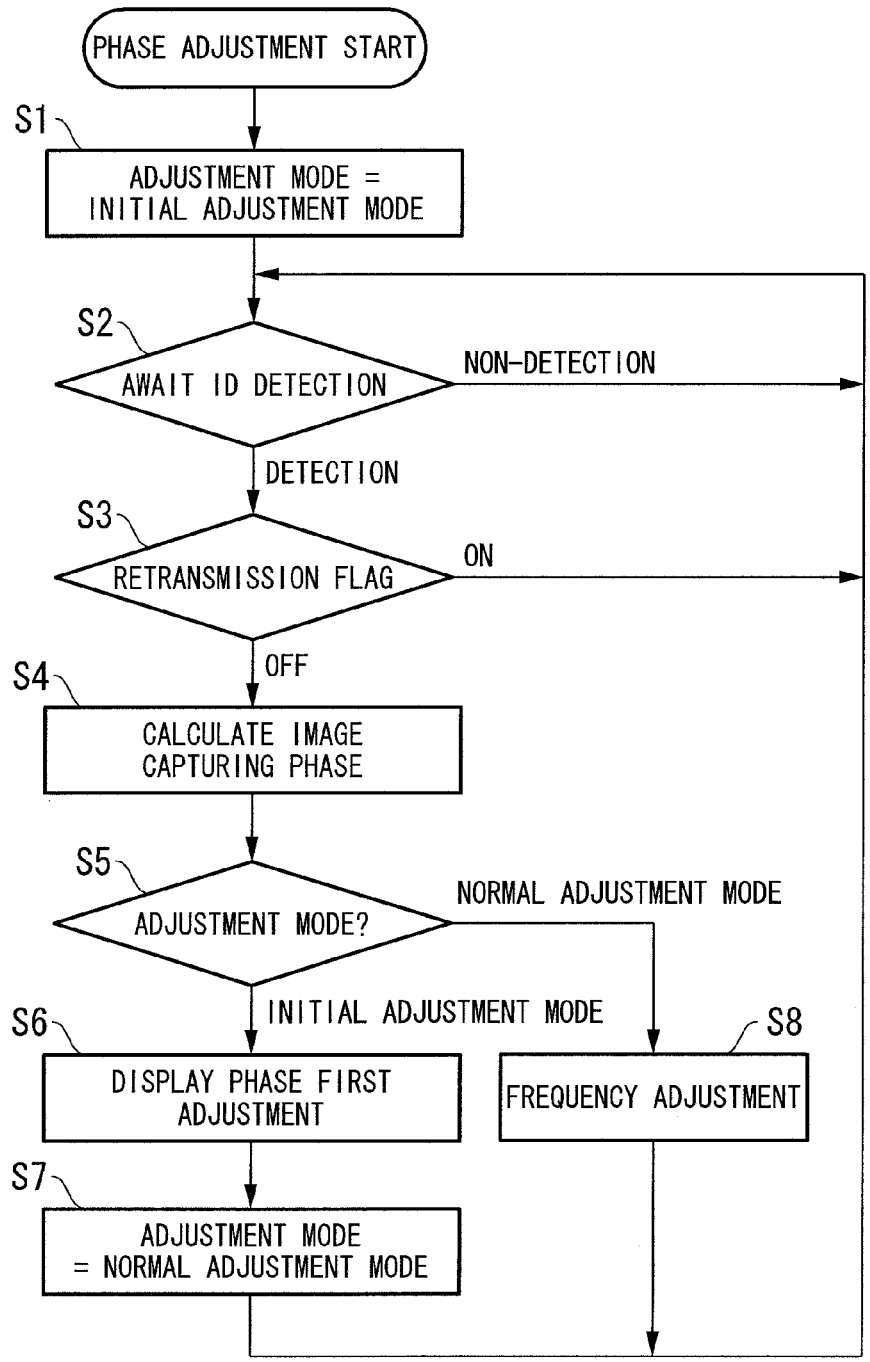
FIG. 8 is a flow chart illustrating a phase adjustment operation in the display apparatus in accordance with the first preferred embodiment of the present invention.

FIG. 8 illustrates a phase adjustment operation in the display device 11. With reference to FIG. 8, the phase adjustment operation from the start of an operation of the display device 11 will be described. An operation mode of the initial adjustment period of the display device 11 is an initial adjustment mode, and an operation mode of the normal adjustment period is a normal adjustment mode. First, the initial adjustment mode will be described.

At the time of the operation start, the adjustment mode is the initial phase adjustment mode (S1). The ID detection circuit 18 waits for the detection of a packet ID of a specified packet (a packet of a frame head in the first preferred embodiment) (S2), and checks a retransmission flag when the packet ID of the specified packet has been detected (S3). When the retransmission flag is raised (is turned ON), the ID detection circuit 18 waits for a subsequent frame. In this case, the ID detection timing signal 23 is not output from the ID detection circuit 18.

When the retransmission flag is not raised (is turned OFF), the ID detection timing signal 23 is output from the ID detection circuit 18, and the image capturing phase detection circuit 19 calculates an image capturing phase based on the ID detection timing signal 23 (S4). After the image capturing phase is calculated, the display control circuit 22 checks an adjustment mode (S5), and controls the display phase adjustment circuit 20 when the adjustment mode is the initial adjustment mode. The display phase adjustment circuit 20 sets the value of the initial phase register 28 in the display phase counter 29, thereby performing display phase first adjustment (S6).

Then, the display control circuit 22 sets the adjustment mode to the normal adjustment mode (S7), and completes the initial adjustment mode.

Next, the normal adjustment mode will be described. When the adjustment mode is the normal adjustment mode (S5), the display clock generation circuit 21 adjusts the frequency of the display clock 26 based on the image capturing phase data 24 from the image capturing phase detection circuit 19 (S8). The normal adjustment mode continues until the operation of the display device 11 is completed, or long interruption of the transmission data from the image capturing device 1 occurs. The long interruption of the transmission data from the image capturing device 1 is detected through the measurement of the ID detection timing signal 23 by the display control circuit 22. However, since it is technology not related to the present invention, a description thereof will be omitted here.

Figure 9:
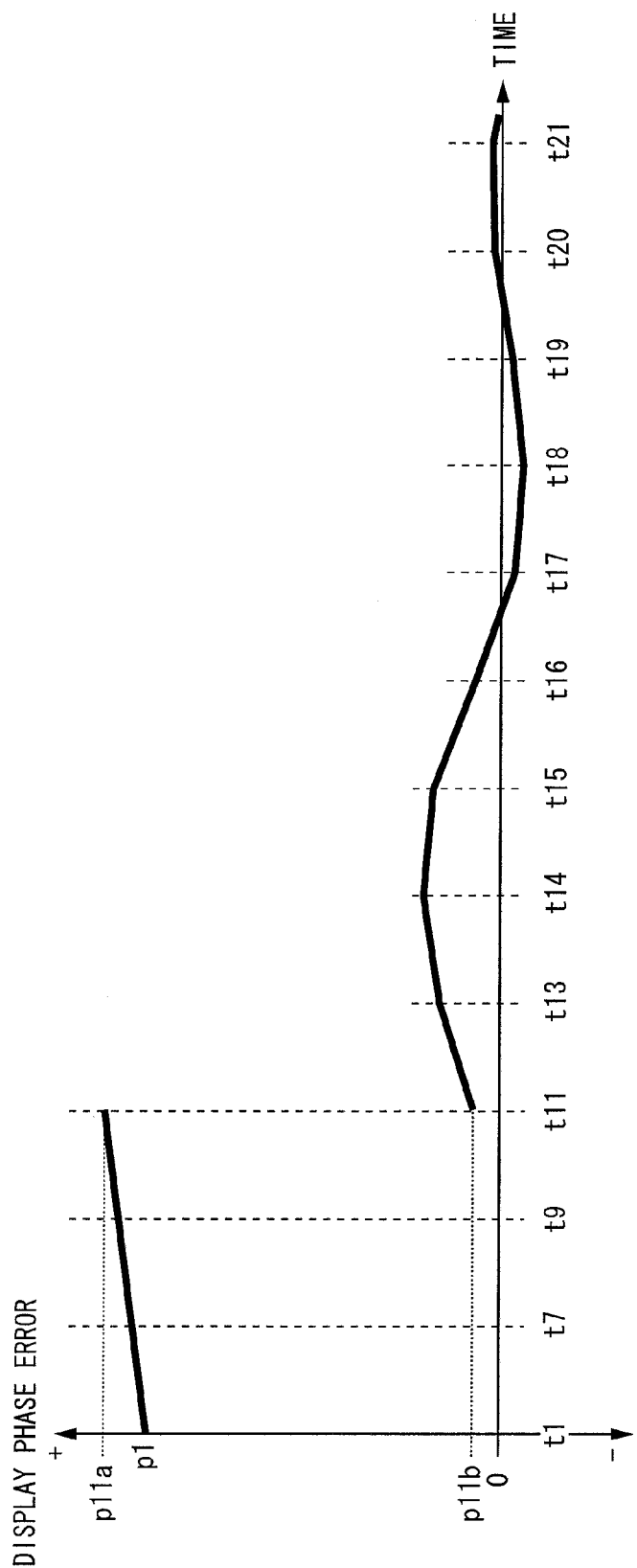
FIG. 9 is a schematic diagram illustrating a change in the difference between an actual display phase and an optimal display phase in accordance with the first preferred embodiment of the present invention.

FIG. 9 is an example of a schematic diagram illustrating a change in the difference (hereinafter referred to as a display phase difference) between an actual display phase and an optimal display phase immediately after the start of an operation. FIG. 9 illustrates a phase change when performing an operation according to the timing chart of FIG. 6. Times t1 to t13 of FIG. 9 correspond to the times t1 to t13 of FIG. 6. Times t14 to t21 of FIG. 9 illustrate time points after the time t13 of FIG. 6.

In the present invention, since the head packets of the first and second frames immediately after the start of the operation are described as being received after retransmission, the display phase adjustment is not performed at the time of reception of the first and second frames.

In FIG. 9, at the time t1, an unadjusted phase difference is indicated as p1. Furthermore, a phase difference at the time t11 immediately before adjustment is indicated as p11a obtained by adding a phase difference to p1, wherein the phase difference is generated by a frequency difference between an image capturing clock and the display clock 26 in periods of the times t1 to t11.

At the time point of the time t11, setting of the display phase adjustment circuit 20 is performed and the initial adjustment period is completed. At the time t11 immediately after the adjustment, a phase difference is indicated as p11b by an adjustment error. Then, the normal adjustment period is reached, and the frequency of the display clock 26 from the display clock generation circuit 21 is controlled such that the display phase error is 0, so that the display phase error converges to 0 as illustrated in FIG. 9.

In the first preferred embodiment, the case in which the retransmission flag is turned ON at the time of retransmission has been described as an example. However, for example, even when a packet ID is changed at the time of the retransmission and an ID indicating the retransmission is added, it is possible to perform the same process as in the retransmission flag.

As described above, according to the first preferred embodiment, a specified packet is extracted from transmission data, and a phase adjustment process of a display signal is performed using a result obtained by measuring the reception timing of the specified packet, so that it is possible to perform a display process in synchronization with the operation of the image capturing device. Furthermore, the specified packet is used, so that it is not necessary to add time information causing an increase in the amount of data, resulting in the suppression of the amount of the transmission data. Particularly, the reception timing of an ID for packet identification is measured at the time of measurement of the reception timing of the specified packet, so that it is not necessary to change a conventional packet configuration, and it is possible to measure the reception timing without an increase in the amount of transmission information.

Furthermore, it is determined whether the specified packet is retransmitted and the reception timing of a non-retransmitted specified packet is used, so that it is possible to exclude time deviation due to retransmission and to accurately detect an image capturing phase.

Furthermore, a change in the specified pattern is detected (corresponding to the case in which the ID indicating the retransmission is added instead of the retransmission flag), and it is determined whether the specified packet is retransmitted, so that it is possible to easily perform the detection of retransmission.

Second Preferred Embodiment

Figure 10:
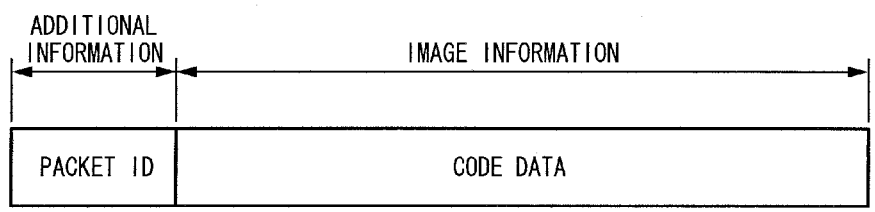
FIG. 10 is a configuration diagram illustrating the configuration of a data packet in accordance with a second preferred embodiment of the present invention.

Next, with reference to FIG. 10 to FIG. 12, a second preferred embodiment of the present invention will be described. In the second preferred embodiment, since the configuration of a display system is the same as that of the first preferred embodiment, a description thereof will be omitted here. FIG. 10 illustrates the configuration of a data packet. As illustrated in FIG. 10, the data packet of the second preferred embodiment includes additional information having a packet ID indicating a type of packet and a number (indicating a position in a frame of image information of the packet), and image information including coded data. That is, differently from the first preferred embodiment, a retransmission flag is not arranged in the additional information.

In the second preferred embodiment, a reception interval of one specified packet prepared for each frame is measured in a previous frame and a current frame, and when the reception interval is in a predetermined range, the phase of a display signal is adjusted using the reception timing of the specified packet of the current frame.

In the second preferred embodiment, when retransmission has occurred in the specified packets of both of the previous frame and the current frame, control is performed to change the waiting time until the start of retransmission such that a reception interval is not the same as a reception interval when no retransmission has occurred. For example, when the waiting time until the start of retransmission in an $N^{th}$ frame (N=1, 3, 5, . . . ) is set as WT1 and a waiting time until the start of the retransmission in an $N+1^{th}$ frame is set as WT2, WT1 is allowed to be unequal to WT2, so that it is possible for the reception interval of a specified packet at the time of occurrence of the retransmission to be different from the reception interval of a specified packet at the time of non-occurrence of the retransmission.

In the second preferred embodiment, a significant difference from the first preferred embodiment is the function of the ID detection circuit 18. The ID detection circuit 18 of the first preferred embodiment recognizes the packet of the frame head by the packet ID in the additional information, confirms the presence or absence of retransmission by turning ON/OFF the transmission flag, and creates the ID detection timing signal 23. Differently from the first preferred embodiment, the ID detection circuit 18 of the second preferred embodiment has an interval measurement counter that measures an elapsed time from a previous confirmation time point to a current confirmation time point based on a confirmation time point of the packet of the frame head by the packet ID in the additional information, and allows the ID detection timing signal 23 to be turned ON when the elapsed time is in a predetermined range.

Figure 11:
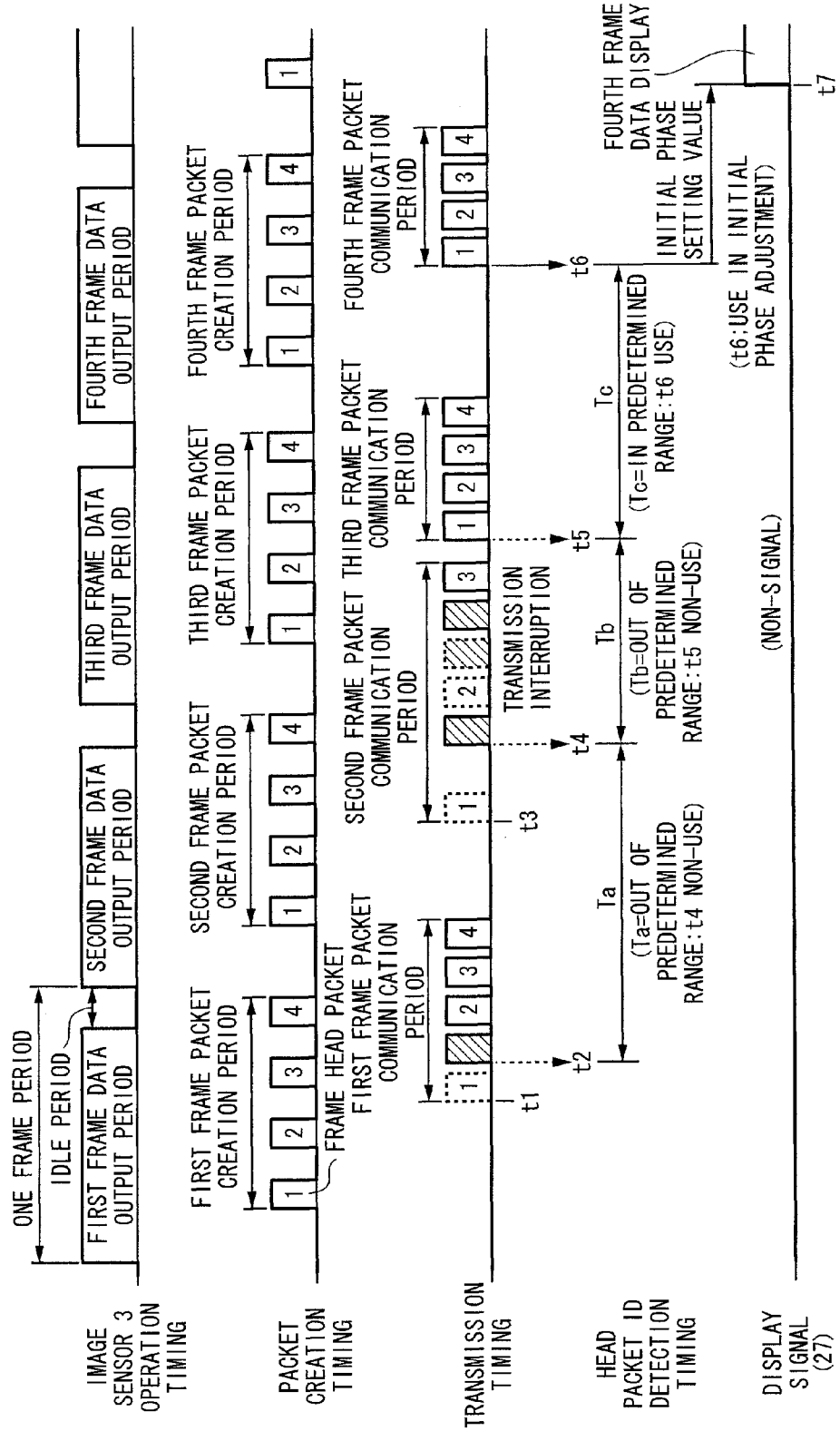
FIG. 11 is a flow chart illustrating a relation among the image capturing phase, the timing of the transmission data, and the phase of the display signal in the initial adjustment period in accordance with the second preferred embodiment of the present invention.

FIG. 11 illustrates a relation among the image capturing phase, the timing of the transmission data, and the phase of the display signal in the initial adjustment period. With reference to FIG. 11, the initial adjustment period will be described as an example.

The time t1 indicates the timing at which the transmission of the head packet of the first frame has been started. Similarly to the first preferred embodiment, the present invention employs an example in which a communication path is deteriorated at the time of transmission of the first frame and the second frame, the head packet is retransmitted in communication of the first frame, and communication corresponding to four packets is not completed and is interrupted in a predetermined period in the second frame.

The image capturing device 1 of the second preferred embodiment starts retransmission from the time t2 after waiting a retransmission waiting time WT1 in the first frame, and starts retransmission from the time t4 after waiting a retransmission waiting time WT2 in the second frame. In the present invention, the image capturing device 1 controls a retransmission interval. However, the display device 11 may control a transmission interval of an ACK packet, thereby controlling a waiting time until the start of retransmission.

In FIG. 11, times t2, t4, t5, and t6 indicate the timings at which the packet ID of the head packet of each frame has been detected. Since a reception interval Ta of a head packet of the first and second frames is out of a predetermined range (is too much longer than the predetermined range), the ID detection timing signal 23 is not turned ON at the time t4. Furthermore, since a reception interval Tb of a head packet of the second and third frames is out of a predetermined range (is too much shorter than the predetermined range), the ID detection timing signal 23 is not turned ON at the time t5. Therefore, the initial adjustment period continues.

Meanwhile, since head packets of the third and fourth frames are not retransmitted and a reception interval Tc of the head packets of the third and fourth frames is in a predetermined range, the ID detection timing signal 23 is turned ON at the time t6. As a consequence, the initial phase adjustment of the display signal 27 is performed, and the initial adjustment period is completed.

Figure 12:
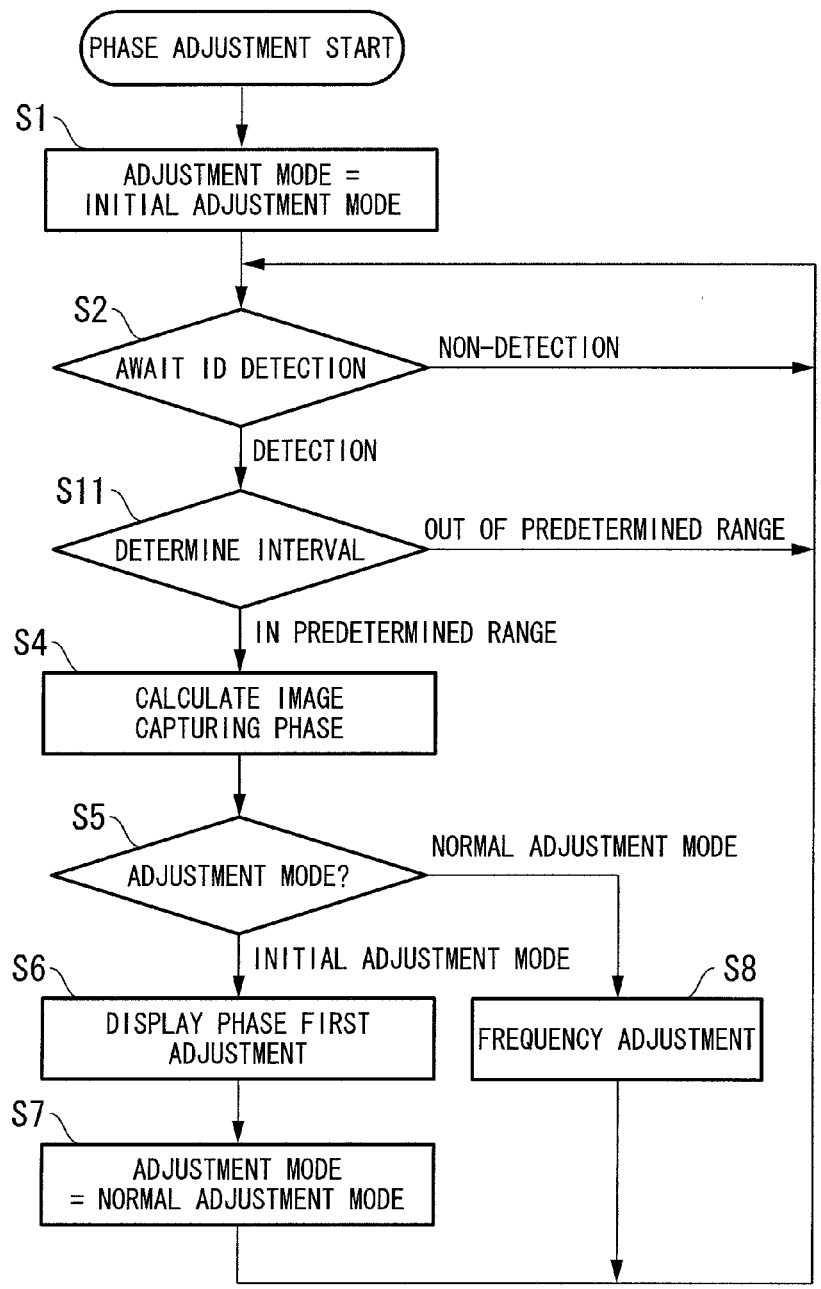
FIG. 12 is a flow chart illustrating a phase adjustment operation in accordance with the second preferred embodiment of the present invention.

FIG. 12 illustrates a phase adjustment operation in the display device 11. With reference to FIG. 12, the phase adjustment operation from the start of the operation of the display device 11 will be described. In the second preferred embodiment, instead of the confirmation (S3) of the retransmission flag of the first preferred embodiment, the confirmation (S11) of the reception interval of the packet of a frame head is performed. The ID detection circuit 18 stores a count value of the counter in a buffer at the output time point of the ID detection timing signal 23, and then resets the count value to 0 in each frame. The ID detection circuit 18 determines the reception interval based on the count value (S11).

When the count value is out of a predetermined range, the ID detection circuit 18 waits for a subsequent frame. In this case, the ID detection timing signal 23 is not output from the ID detection circuit 18. When the count value is in the predetermined range, the ID detection timing signal 23 is output from the ID detection circuit 18. Except for this, the second preferred embodiment is approximately the same as the first preferred embodiment.

As described above, according to the second preferred embodiment, a change in the reception interval of the specified packet is detected and it is determined whether the specified packet is retransmitted, so that information for retransmission detection is not required, resulting in a reduction of the amount of transmission data.

Third Preferred Embodiment

Next, with reference to FIG. 13 and FIG. 14, a third preferred embodiment of the present invention will be described. In the third preferred embodiment, since the configuration of a display system is the same as that of the first preferred embodiment, a description thereof will be omitted here.

The third preferred embodiment uses a communication method of performing no retransmission process of a specified packet, stopping transmission of a frame including the specified packet at the time point at which communication of the specified packet fails, and reopening transmission from the head of a subsequent frame. Furthermore, the third preferred embodiment uses a method of designating a head packet as the specified packet until initial adjustment is completed in the initial adjustment period immediately after the start of communication, and designating a head packet of a frame with a prescribed cycle as the specified packet in the normal adjustment period.

The cycle of the specified packet is selected according to the characteristics of a clock circuit used in the image capturing device 1 and the display device 11. When a clock frequency difference is large and frequency stability is low, the specified packet is frequently transmitted and phase adjustment is finely performed. For example, all head packets of frames may be designated as the specified packet. In this case, it is advantageous that the accuracy of the phase adjustment be improved, but when a communication environment is deteriorated, it is highly probable that the specified packet will be subjected to communication failure. When the clock frequency difference is small and the frequency stability is high, the communication cycle of the specified packet is set to be long.

In the third preferred embodiment, since the specified packet is transmitted without a retransmission process, the point at which the reception timing of the specified packet is unconditionally available for the phase adjustment is different from the first and second preferred embodiments. Furthermore, the specified packet is created with high redundancy as compared with other packets, and various efforts have been made to prevent communication failure even when a communication path is deteriorated.

In the third preferred embodiment, a significant difference from the first and second preferred embodiments is the function of the image capturing device 1 performing the transmission and the function of the ID detection circuit 18. The ID detection circuit 18 allows the ID detection timing signal 23 to be turned ON based on the confirmation time point of the specified packet based on the packet ID in the additional information. Except for this, the third preferred embodiment is the same as the first preferred embodiment.

Figure 13:
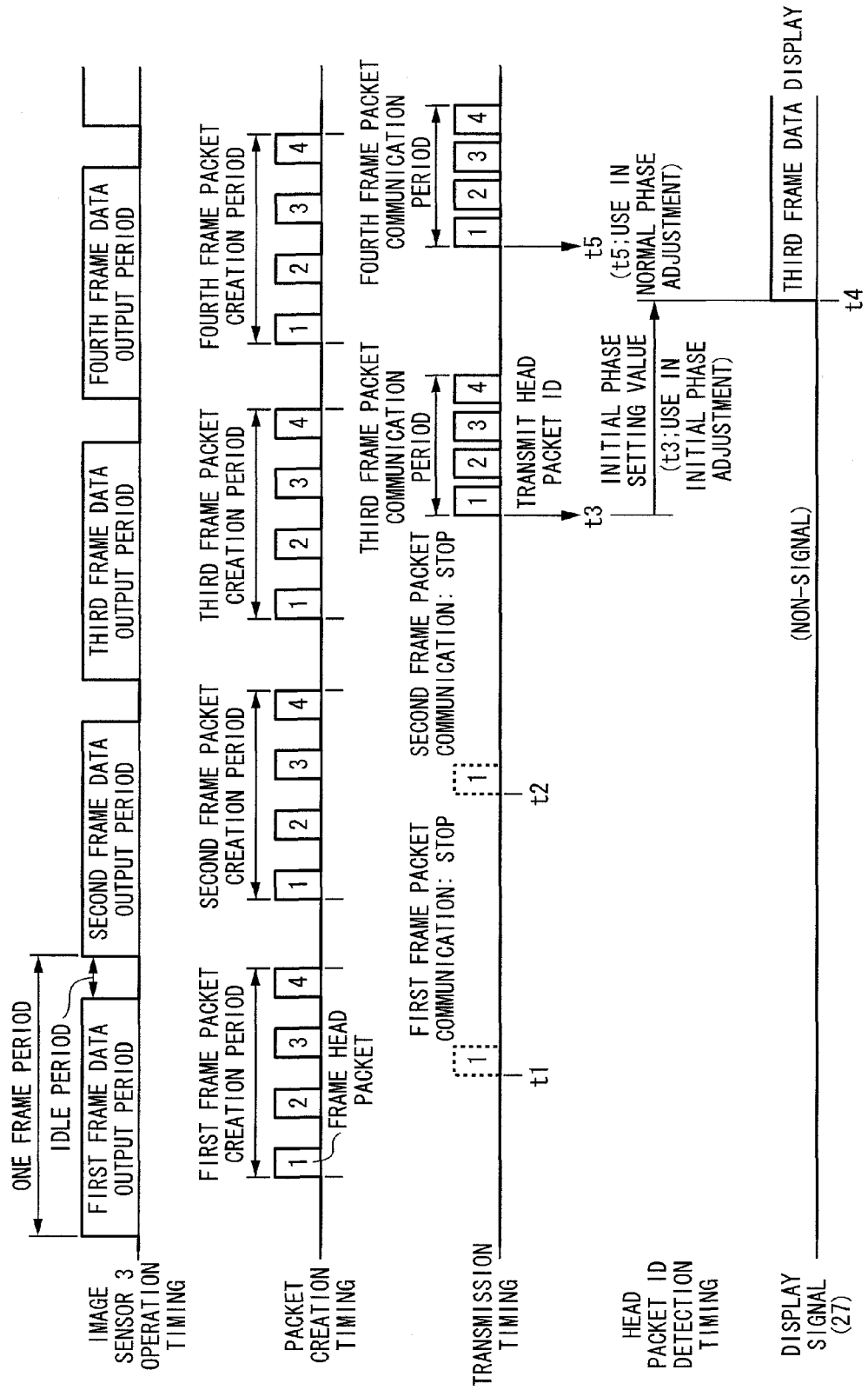
FIG. 13 is a flow chart illustrating a relation among the image capturing phase, the timing of the transmission data, and the phase of the display signal in the initial adjustment period in accordance with a third preferred embodiment of the present invention.
Figure 14:
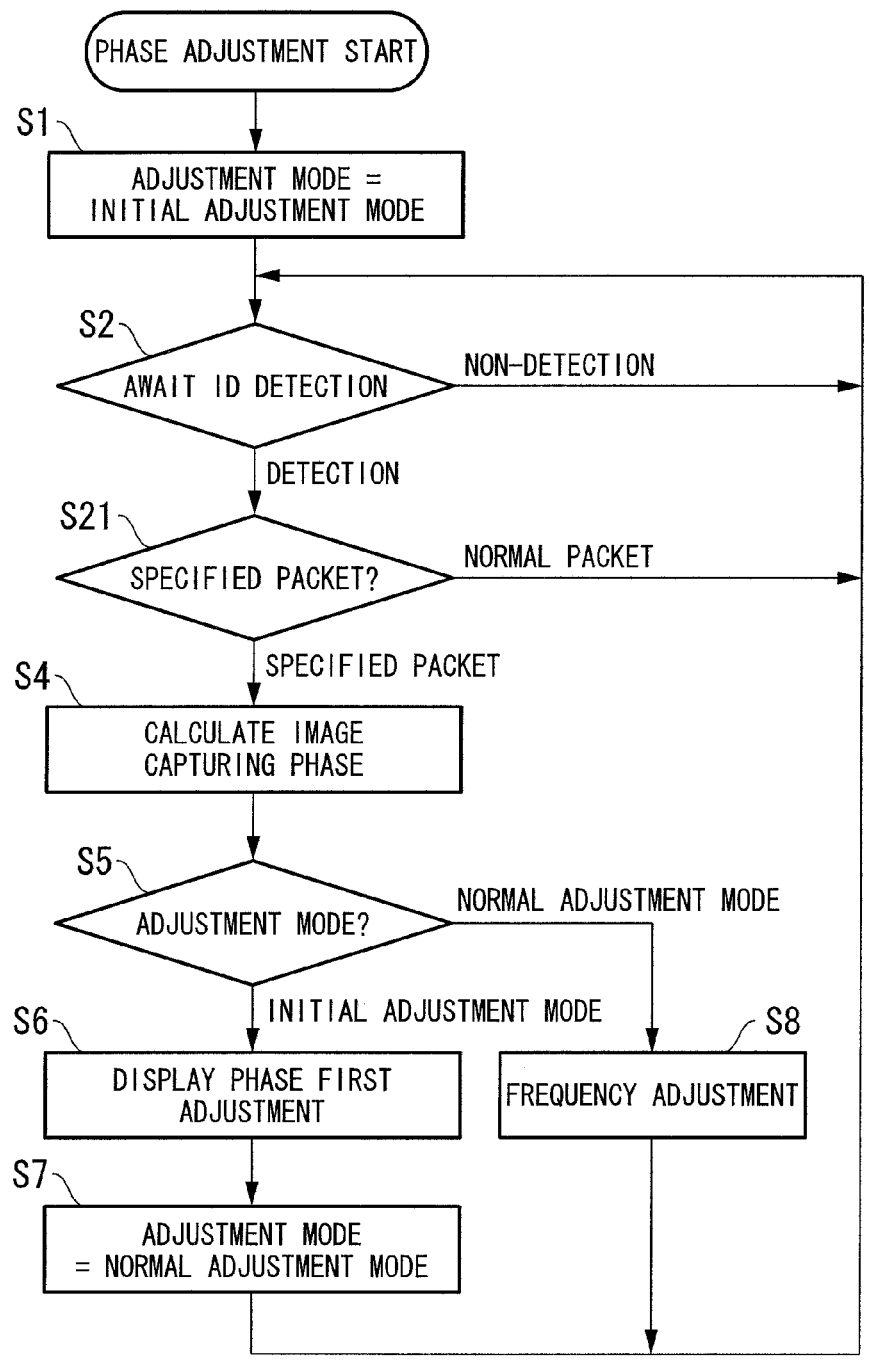
FIG. 14 is a flow chart illustrating a phase adjustment operation in accordance with the third preferred embodiment of the present invention.

With reference to FIG. 13, the initial adjustment period will be described as an example. Similarly to the first preferred embodiment, the third preferred embodiment employs an example in which a communication path is deteriorated at the time of transmission of the first frame and the second frame, the head packet is retransmitted in communication of the first frame, and communication corresponding to four packets is not completed and is interrupted in a predetermined period of time in the second frame.

The time t1 indicates the timing at which the transmission of the head packet of the first frame has been started, and the time t2 indicates the timing at which the transmission of the head packet of the second frame has been started. Since a communication environment is deteriorated at the time of communication of the head packets together with the first frame and the second frame, and communication of the head packets fails, transmission of each packet is interrupted.

In FIG. 13, times t3 and t5 indicate the timings at which the packet ID of the head packet of each frame has been detected. Since it is not necessary to notify of the presence or absence of retransmission, the image capturing device 1 of the third preferred embodiment transmits the data packet with the configuration having no retransmission flag illustrated in FIG. 10 of the second preferred embodiment. Furthermore, in transmission of a frame including the specified packet, communication of the frame is completed at the time point at which communication of the specified packet has failed.

The time t3 indicates the timing at which the transmission of the head packet of the third frame has been started, and the ID detection timing signal 23 is turned ON at the time point of the time t3. As a consequence, the initial adjustment of the display signal 27 is performed, and similarly to the case of the first preferred embodiment, the adjustment is performed such that the head phase of the display signal 27 is reached at the time point of the time t4, and the initial adjustment period is completed. Then, the normal adjustment period is reached, and for example, when the head packet of the fourth frame has been designated as the specified packet, the time t5, which indicates the detection timing of the head packet, is used for phase adjustment.

Next, with reference to FIG. 14, the phase adjustment operation will be described. The flowchart illustrated in FIG. 14 is substantially the same as the flowchart (FIG. 8) of the first preferred embodiment, except that S3 (the retransmission determination based on the detection of the retransmission flag) is replaced with S21.

Step S21 is a determination step of a specified packet, and the ID detection circuit 18 determines whether a received packet is a specified packet designated in advance. For example, in the initial adjustment period, a head packet of a frame is unconditionally determined as the specified packet, and in the normal adjustment period, determination is made based on rule that a head packet becomes the specified packet every 10 frames.

When the received packet is not the specified packet, the ID detection circuit 18 waits for a subsequent frame. In this case, the ID detection timing signal 23 is not output from the ID detection circuit 18. When the received packet is the specified packet, the ID detection timing signal 23 is output from the ID detection circuit 18. Except for this, the third preferred embodiment is approximately the same as the first preferred embodiment.

As described above, according to the third preferred embodiment, a packet not to be subjected to retransmission is used as the specified packet, so that determination of retransmission is not required, resulting in the simplification of the phase adjustment circuit.

Furthermore, the phase adjustment is performed only from the reception timing of the specified packet received immediately after the start of the operation, so that the procedure of the phase adjustment immediately after the start of the operation is simplified, resulting in the reduction of a circuit scale. Specifically, in the operation illustrated in FIG. 14, since the determination in step S21 is performed using the packet ID detected in step S2, the process is simplified as compared with step S3 of FIG. 8 and step S11 of FIG. 11.

Furthermore, a packet periodically transmitted by the image capturing device 1 is determined in advance as the specified packet, so that the procedure of the phase adjustment is simplified, resulting in a reduction of a circuit scale.

Furthermore, the specified packet is transmitted using a scheme resistant to the deterioration of a transmission path as compared with other packets, so that it is possible to reduce the probability that a specified packet not to be subjected to retransmission will not be communicated.

Fourth Preferred Embodiment

Next, with reference to FIG. 15 and FIG. 16, a fourth preferred embodiment of the present invention will be described.

Similarly to the third preferred embodiment, the fourth preferred embodiment uses a communication method of performing no retransmission process of a specified packet, stopping transmission of a frame including the specified packet at the time point at which communication of the specified packet fails, and reopening transmission from the head of a subsequent frame. The fourth preferred embodiment is substantially the same as the third preferred embodiment, except that the designation of the specified packet is performed by the display device 11. Furthermore, the specified packet of the fourth preferred embodiment is transmitted at a low communication speed as compared with other packets, and various efforts have been made to prevent communication failure even when a communication path is deteriorated.

The display device 11 of the fourth preferred embodiment completes the reception of a last packet of a previous frame, and requests the image capturing device 1 to transmit the specified packet during a reception idle period until the reception of a head packet of a subsequent frame is started. When the transmission request of the specified packet is received, the image capturing device 1 transmits the head packet of the subsequent frame as the specified packet. Since the specified packet is not subjected to the retransmission process, the image capturing device 1 stops the transmission of a frame including the specified packet at the time point at which communication has failed, and reopens transmission from the head of the subsequent frame.

Figure 15:
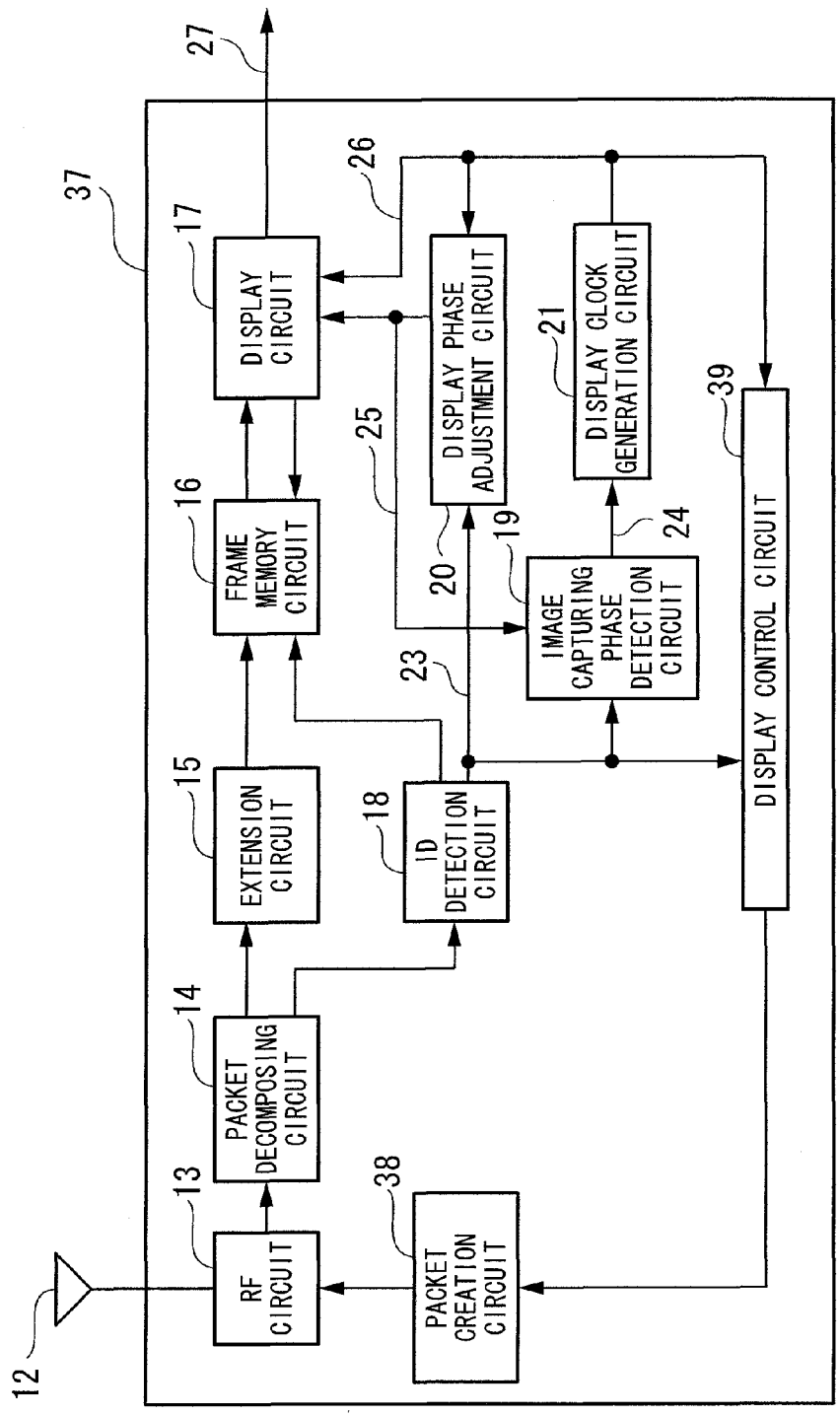
FIG. 15 is a block diagram illustrating the configuration of a display system in accordance with a fourth preferred embodiment of the present invention.
Figure 16:
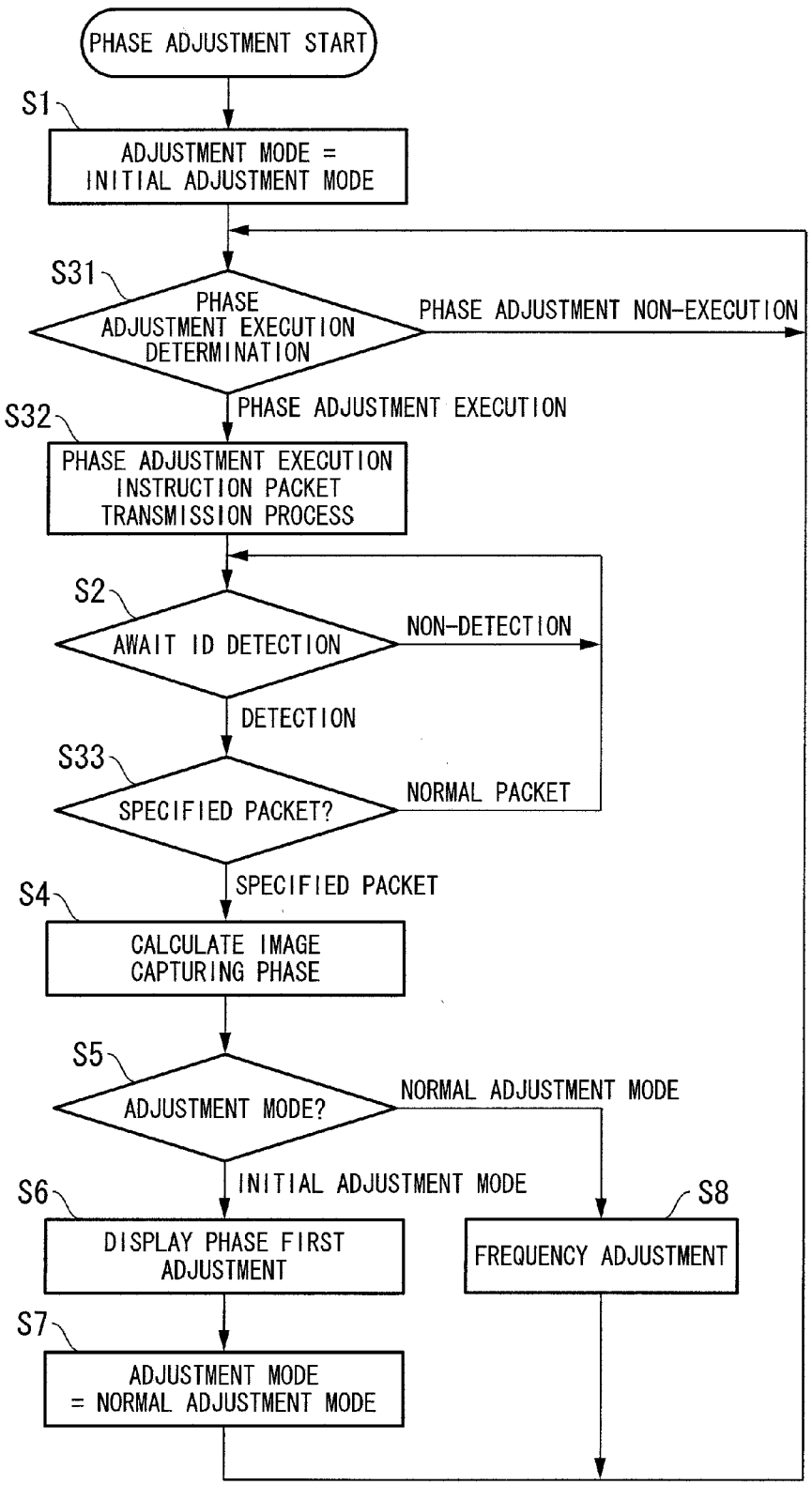
FIG. 16 is a flow chart illustrating a phase adjustment operation in accordance with the fourth preferred embodiment of the present invention.

FIG. 15 illustrates the configuration of a display device 37 in accordance with the fourth preferred embodiment of the present invention. As illustrated in FIG. 15, the display device 37 has a configuration in which the ACK packet creation circuit 36 of the display device 11 illustrated in FIG. 1 is replaced with a packet creation circuit 38. The packet creation circuit 38 creates a phase adjustment execution instruction packet for requesting the image capturing device 1 to transmit the specified packet, according to an instruction of the display control circuit 39, in addition to the function of creating the ACK packet which is the same as that of the ACK packet creation circuit 36.

Next, with reference to FIG. 16, the phase adjustment operation will be described. The flowchart illustrated in FIG. 16 is substantially equal to the flowchart (FIG. 14) of the third preferred embodiment, except that step S21 (the determination of the specified packet) is removed, and steps S31 and S32 for requesting the specified packet are inserted between steps S1 and S2.

Step S31 is a determination step regarding a request of the specified packet for performing the phase adjustment, and the display control circuit 39 determines whether to request the specified packet to be added at the time of transmission of a subsequent frame based on various states (for example, states that the initial adjustment not be completed, the phase adjustment interval be empty, a change in frequency control be large and thus a display phase not converge, and the like) of the display device 11.

When the specified packet has not been requested, the packet creation circuit 38 waits for a subsequent frame. Furthermore, when the specified packet has been requested, the packet creation circuit 38 performs a transmission process of the phase adjustment execution instruction packet according to the instruction of the display control circuit 39 (S32).

Hereinafter, the operations of the image capturing device 1 and the display device 37 associated with the transmission/reception of the phase adjustment execution instruction packet will be described.

The image capturing device 1 receives the phase adjustment execution instruction packet and starts communication of data corresponding to one frame including the specified packet, and then stops the communication of the frame when the communication of the specified packet included in the data fails. When an ACK packet has not been returned within a predetermined time after the specified packet has been transmitted, the image capturing device 1 determines that the communication of the specified packet is not possible.

When the transmission of the specified packet has been requested, the image capturing device 1 repeats the transmission of the frame including the specified packet until the transmission of the specified packet is succeeded. When the communication has failed, the image capturing device 1 adds the specified packet to a subsequent frame and transmits the specified packet.

As described above, since the image capturing device 1 continues to transmit the specified packet until the transmission of the specified packet succeeds, the determination in step S31 is made based on whether the phase adjustment of the display device 37 is required at that time point. Similarly to the first preferred embodiment, step S2 is a step in which the display device waits for the detection of a packet ID.

When the packet ID is detected in step S2, the ID detection circuit 18 determines whether a received packet is the specified packet (S33). The present process is required for packets other than a head packet, for example, when the last packet is used as the specified packet. For example, when the specified packet is a second packet in a frame, since step S32 is performed during the reception idle period, the packet ID of a frame head packet is detected in step S2 before the specified packet is received. In this case, since the head packet is not the specified packet, it is necessary to prevent the phase adjustment process from being performed in step S33.

After the specified packet is detected in step S33, the following process is unconditionally performed. Through the process, it is possible for the display device 37 to obtain information for phase adjustment at a desired timing. Since the following process is the same as that in the first preferred embodiment, a description thereof will be omitted here.

As described above, according to the fourth preferred embodiment, it is possible for the display device to determine a transmission timing of a packet not to be subjected to retransmission, so that it is possible to acquire phase data for phase adjustment according to the state of a display phase, and thus phase adjustment with high accuracy is possible.

While preferred embodiments of the present invention have been described and illustrated above, it should be understood that these are examples of the present invention and are not to be considered as limiting. Additions, omissions, substitutions, and other modifications can be made without departing from the scope of the present invention. In the above, the image capturing cycle is a frame. However, the image capturing cycle may be a field.

The present invention can be extensively applied to a display device that receives data from an image capturing device and performs a display process, and a display system provided with the image capturing device and the display device.

What is claimed is:

1. A display device comprising:
a reception unit that receives transmission data from an image capturing device that performs an image capturing process with a predetermined cycle to create image capturing data in each frame or field, packetizes the image capturing data to create the transmission data, and performs a transmission process of transmitting at least one of a plurality of packets corresponding to one frame or one field of the image capturing data as a specified packet when the transmission data is transmitted in a case in which a packet to be transmitted with a predetermined phase for an image capturing phase of the image capturing process is defined as the specified packet;
a display processing unit that performs a display process of creating a display signal for display from the transmission data;
a measurement unit that measures a reception timing of the specified packet of the transmission data;
a determination unit that determines whether or not the specified packet is a retransmitted packet; and
a processing unit that performs a phase adjustment process of the display signal using a measurement result by the measurement unit at the reception timing of only the specified packet, which has been determined not to be a retransmitted packet among the specified packet by the determination unit.

2. The display device according to claim 1, wherein the determination unit detects a change in a reception interval of the specified packet, and determines whether the specified packet has been retransmitted.

3. The display device according to claim 1, wherein a fact that the specified packet is not subjected to a retransmission process is designated in advance, and the determination unit determines, as the reception state of the specified packet, whether the specified packet has been received.

4. The display device according to claim 3, wherein at least one of a plurality of packets corresponding to one frame or one field of transmission data immediately after an operation of the image capturing device or the display device starts is designated as the specified packet, and designation of the specified packet of transmission data is continued until the specified packet is received without performing the retransmission process.

5. The display device according to claim 3, wherein the specified packet is a packet that is periodically designated and transmitted by the image capturing device.

6. The display device according to claim 3, wherein the specified packet is designated based on a request of the display device.

7. The display device according to claim 3, wherein the specified packet is transmitted using a scheme resistant to deterioration of a transmission path compared with other packets.

8. A display system including an image capturing device and a display device, wherein the image capturing device comprises:
- an image capturing unit that performs an image capturing process with a predetermined cycle to create image capturing data in each frame or field;
- a data processing unit that packetizes the image capturing data to create transmission data; and
- a transmission unit that transmits the transmission data, and transmits at least one of a plurality of packets of the transmission data, which corresponds to one frame or one field of the image capturing data, as a specified packet when a packet to be transmitted with a predetermined phase for an image capturing phase of the image capturing process is defined as the specified packet, wherein the display device comprises:
- a reception unit that receives the transmission data from the image capturing device;
- a display processing unit that performs a display process of creating a display signal for display from the transmission data;
- a measurement unit that extracts a specified packet from the transmission data and measures a reception timing of the specified packet;
- a determination unit that determines whether or not the specified packet is a retransmitted packet; and
- a processing unit that performs a phase adjustment process of the display signal using a measurement result by the measurement unit at the reception timing of only the specified packet, which has been determined not to be a retransmitted packet among the specified packet by the determination unit.

* * * * *